United States Patent
Cohen (10) Patent No.: US 7,653,036 B2
(45) Date of Patent: Jan. 26, 2010

(54) METHOD AND SYSTEM FOR AUTOMATIC REGISTRATION SECURITY

(75) Inventor: David Lawrence Cohen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 400 days.

(21) Appl. No.: 11/207,262

(22) Filed: Aug. 18, 2005

(65) Prior Publication Data

US 2006/0039339 A1    Feb. 23, 2006

Related U.S. Application Data

(60) Provisional application No. 60/602,396, filed on Aug. 18, 2004, provisional application No. 60/671,120, filed on Apr. 14, 2005.

(51) Int. Cl.
*H04W 4/00* (2009.01)

(52) U.S. Cl. .................. 370/338; 370/328; 455/433; 455/432.1; 455/435.1; 455/435.2; 455/435.3

(58) Field of Classification Search .................. 370/338, 370/328, 437; 380/277; 455/435.1, 433, 455/435.2, 435.3, 432.1
See application file for complete search history.

(56) References Cited

U.S. PATENT DOCUMENTS

| | | | |
|---|---|---|---|
| 2002/0035699 A1* | 3/2002 | Crosbie | 713/201 |
| 2004/0168081 A1* | 8/2004 | Ladas et al. | 713/201 |
| 2005/0136925 A1* | 6/2005 | Yamauchi | 455/435.1 |
| 2006/0173844 A1* | 8/2006 | Zhang et al. | 707/9 |

OTHER PUBLICATIONS

IEEE Std 802.11™, 2003 Edition, "Information technology-Telecommunications and information exchange between systems-Local and metropolitan area networks-Specific requirements- Part 11: Wireless LAN Medium Access Control (MAC) and Physical Layer (PHY) Specifications", pp. 9-65, Jun. 12, 2003.

* cited by examiner

*Primary Examiner*—Dwayne Bost
*Assistant Examiner*—Pierre-Louis Desir
(74) *Attorney, Agent, or Firm*—McAndrews, Held & Malloy, Ltd.

(57) ABSTRACT

Aspects of a method and system for automatic registration security are presented, and may comprise registering a client station with an access point without requiring a user to enter configuration information at the access point and at the client station. The method may comprise activating a button at an access point and activating a button at a client station to effectuate the registering. Aspects of a system for enabling communication of information in a secure communications network may comprise an access point that registers a client station without requiring a user to enter configuration information at the access point and at the client station. The system may comprise a button that is activated at an access point, and a button that is activated at a client station.

30 Claims, 7 Drawing Sheets

METHOD AND SYSTEM FOR AUTOMATIC REGISTRATION SECURITY

CROSS-REFERENCE TO RELATED APPLICATIONS/INCORPORATION BY REFERENCE

This application makes reference to, claims priority to, and claims the benefit of: U.S. Provisional Application Ser. No. 60/602,396 filed Aug. 18, 2004; and U.S. Provisional Application Ser. No. 60/671,120 filed Apr. 14, 2005;

This application makes reference to:
U.S. application Ser. No. 11/207,302 filed Aug. 18, 2005;
U.S. application Ser. No. 11/207,658 filed Aug. 18, 2005;
U.S. application Ser. No. 11/208,081 filed Aug. 18, 2005;
U.S. application Ser. No. 11/208,310 filed Aug. 18, 2005;
U.S. application Ser. No. 11/208,275 filed Aug. 18, 2005;
U.S. application Ser. No. 11/208,346 filed Aug. 18, 2005;
U.S. application Ser. No. 11/207,661 filed Aug. 18, 2005;
U.S. application Ser. No. 11/207,301 filed Aug. 18, 2005;
U.S. application Ser. No. 11/208,284 filed Aug. 18, 2005; and
U.S. application Ser. No. 11/208,347 filed Aug. 18, 2005.

All of the above referenced applications are hereby incorporated herein by reference in its entirety.

FIELD OF THE INVENTION

Certain embodiments of the invention relate to wireless network communication. More specifically, certain embodiments of the invention relate to a method and system for automatic registration security.

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network can be time consuming. However, for inexperienced computer users, the tasks associated with setting up a wireless network can be more challenging and consumes significantly greater time than required by computer savvy users.

In general, Wi-Fi®, or 802.11-based networks require a significant amount of user interaction during the configuration process. Typically, with conventional Wi-Fi®, or 802.11-based networks, the user needs to configure a non-access point station (STA) to associate with an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name (SSID) that is selected by the manufacturer such as, for example, "Manufacturer Name", "Default", or "wireless". With the proliferation of 802.11 networks, users often experience confusion and network problems when their new AP uses the same SSID as a neighboring AP.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for automatic registration security, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for automatic registration security. In IEEE 802.11 wireless local area network (WLAN) systems, wireless terminal devices, or wireless terminals, for example personal computers or personal digital assistants, may communicate via radio frequency (RF) channels that may be monitored by unauthorized parties at terminal devices that were not intended to participate in the communication. In response, IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Enabling a wireless terminal device to obtain authorization and to utilize encryption may require a user to manually configure the wireless terminal. This manual configuration may require a user to possess extensive knowledge about the WLAN that may exceed that of a typical WLAN user. As a consequence, many users did not configure WLAN networks.

This resulted in insecure networks that were open to being utilized and/or attacked by unauthorized users.

One aspect of the invention may introduce ease of use for network security, and comprise a method that minimizes user interaction and knowledge required to configure a wireless terminal for secure communications in an IEEE 802.11 wireless local area network (WLAN). Components in a system, in accordance with an embodiment of the invention, may comprise an access point (AP) and a client, the latter of which may be alternatively referred to as a client terminal, client device, or client station. A client station, may be referred to as a station.

The AP may be a wireless terminal device, or other device in a WLAN. The AP may provide a service to configure clients, which may be wireless terminal devices, thereby enabling the configured clients to utilize secure RF channels with little interaction required from the user. The client may be a wireless terminal device, or other device in a WLAN.

Figure 1A:
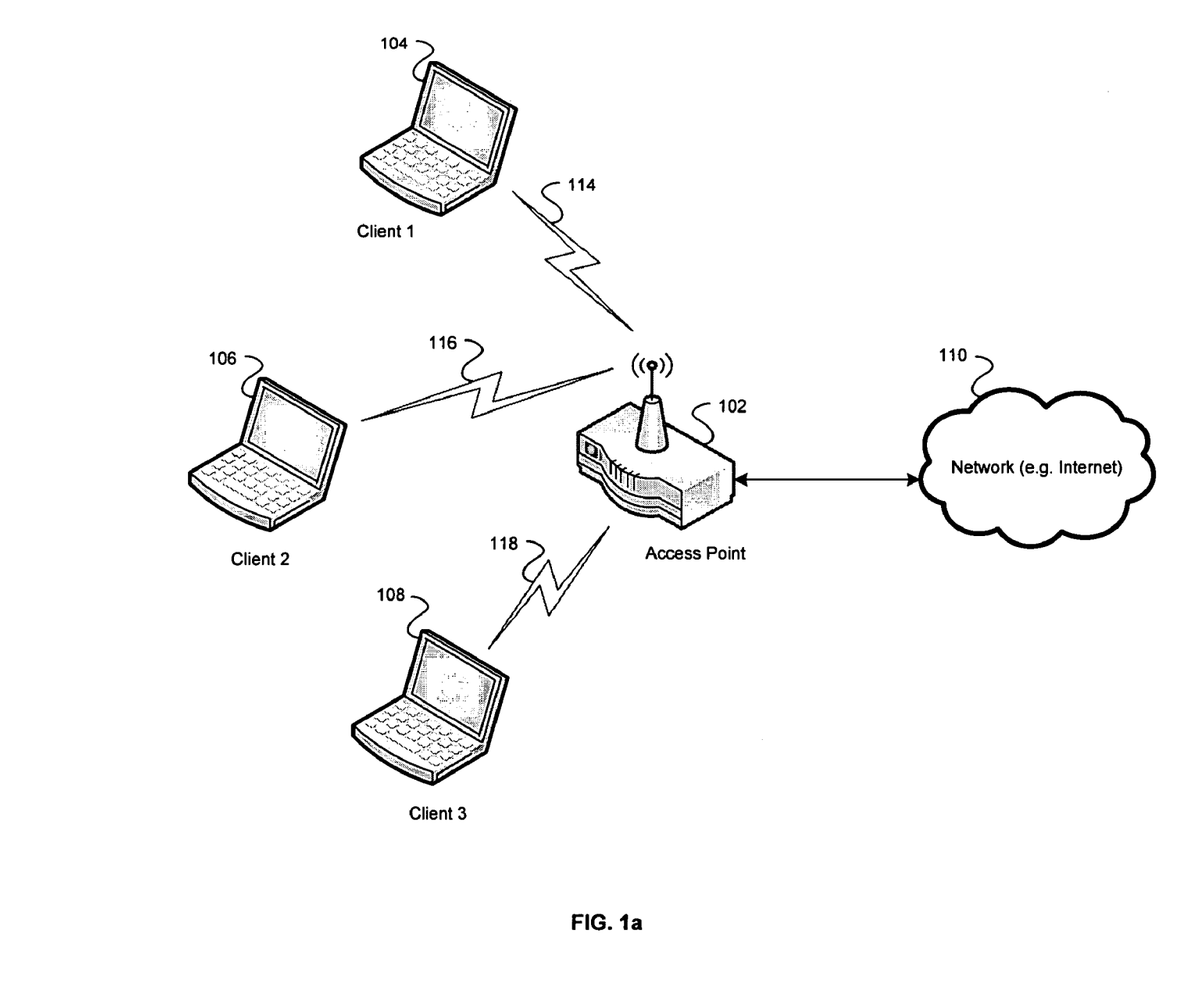
FIG. 1a is a block diagram of an exemplary wireless network, which may be utilized in connection with an embodiment of the invention.

FIG. 1a is a block diagram of an exemplary wireless network, which may be utilized in connection with an embodiment of the invention. Referring to FIG. 1a, there is shown an access point (AP) 102, and a plurality of client stations (STA) 104, 106, and 108, a plurality of RF channels 114, 116, and 118, and a network 110. The STAs 104, 106, and 108 may be wireless terminals such as a PC, a laptop, or a PDA with integrated or plug-in 801.11 capabilities. For example, the PC may utilize a wireless network interface card (NIC) and the laptop or PDA may comprise integrated 801.11 capabilities. The network 110 may be a private or public network, for example, a service provider or the Internet.

In operation, an AP 102 may serve dual roles in a WLAN comprising a station role and a distribution role, an AP 102 may perform a station role when communicating with a STA 104. The AP 102 may perform a distribution role when communicating information via the network 110. The STAs 104, 106 and 108 may comprise stations. In instances where the STAs 104, 106, and 108 are configured, they may communicate with the AP 102 via corresponding secure RF channels 114, 116, and 118, respectively. The AP 102 may communicate information received from a configured STA 104, 106, or 108 via the Internet 110. In instances where the STAs 104, 106, or 108 are unconfigured, they may communicate with the configurator 102 to request configuration information. The configurator 102 may configure a requesting STA 104, 106, or 108 via a corresponding RF channel 114, 116, or 118.

In general, the AP 102 may be adapted to facilitate the registration and/or authentication of client stations so that the client stations may become associated with the AP 102 in secure communications network. Various embodiments of the invention may comprise software that executes in the AP 102 and/or client station 104 in order to facilitate registration and/or authentication. The software may enable the AP 102 to register client stations 104 in a secure communications network. An AP 102 may register a client station 104 by storing information, for example a media access control (MAC) address or an Internet protocol (IP) address, associated with the client station 104. Registration may also comprise configuration of the client station 104 by the AP 102.

An AP 102 may configure a client station 104 by performing software configuration tasks that enable the client station 104 to communicate information to another STA 106 in a secure communications network. In one embodiment of the invention, exemplary software configuration tasks may comprise generating a preshared key (PSK) at an AP 102 and communicating the PSK securely, to the client station 104. The PSK may be utilized to encrypt information communicated by STAs in a secure communications network. The secure communications network may comprise the AP 102, and one or more client stations such as client station 104, that are configured by the AP 102. A system for secure automatic registration in a communications network may comprise an access point 102 that registers a client device 104 without requiring that software configuration tasks be performed by an end user. In this regard, an end user does not have to manually enter configuration information on the AP 102 and/or the client station 104 in order to register and authenticate the client station 104.

In various embodiments of the invention, activating a hardware button and/or software button may register a client station 104 with an AP 102. This may comprise activating a hardware and/or software enabled button located on an AP 102, and by activating a hardware and/or software enabled button located on a client station 104. A hardware button may comprise a physical button that may be dedicated to performing a function related to automatic registration security. A software enabled button may comprise a software icon that appears on a user interface. A hardware button and/or software enabled button may be activated as a result of a method of physical action on the part of a user. Activation of a hardware and/or software enabled button located on an AP 102, and subsequent activation of a hardware and/or software enabled button located on a client station 104, may result in a registering of the client station 104 with the AP 102. The client station 104 may also be configured, by the AP 102, to communicate information in a secure communications network.

Some IEEE 802.11 WLANs utilize a technology for network security based on Wi-Fi Protected Access (WPA), or second generation WPA (WPA2). For example, configuration parameters, such as a PSK or SSID, may require manual entry by a user at an AP 102 and/or at a client station 104 in some conventional WPA-based WLANs. In various embodiments of the invention, in order to provide support for WPA, the PSK and/or SSID may be generated by an AP 102, and entered at a client station 104, by activating a hardware and/or software enabled button located on an AP 102, and/or located on a client station 104. Subsequent to configuration, in accordance with various embodiments of the invention, the configured client station 104 may communicate information in a WPA-based WLAN. A client station 104, which is configured with a PSK and/or SSID in accordance with various embodiments of the invention, may communicate in a secure communication network with a WLAN station 106, for which the PSK and/or SSID were not configured in accordance with various embodiments of the invention. For example, the PSK and SSID may be configured at the WLAN station 106 as a result of manual entry by a user.

Figure 1B:
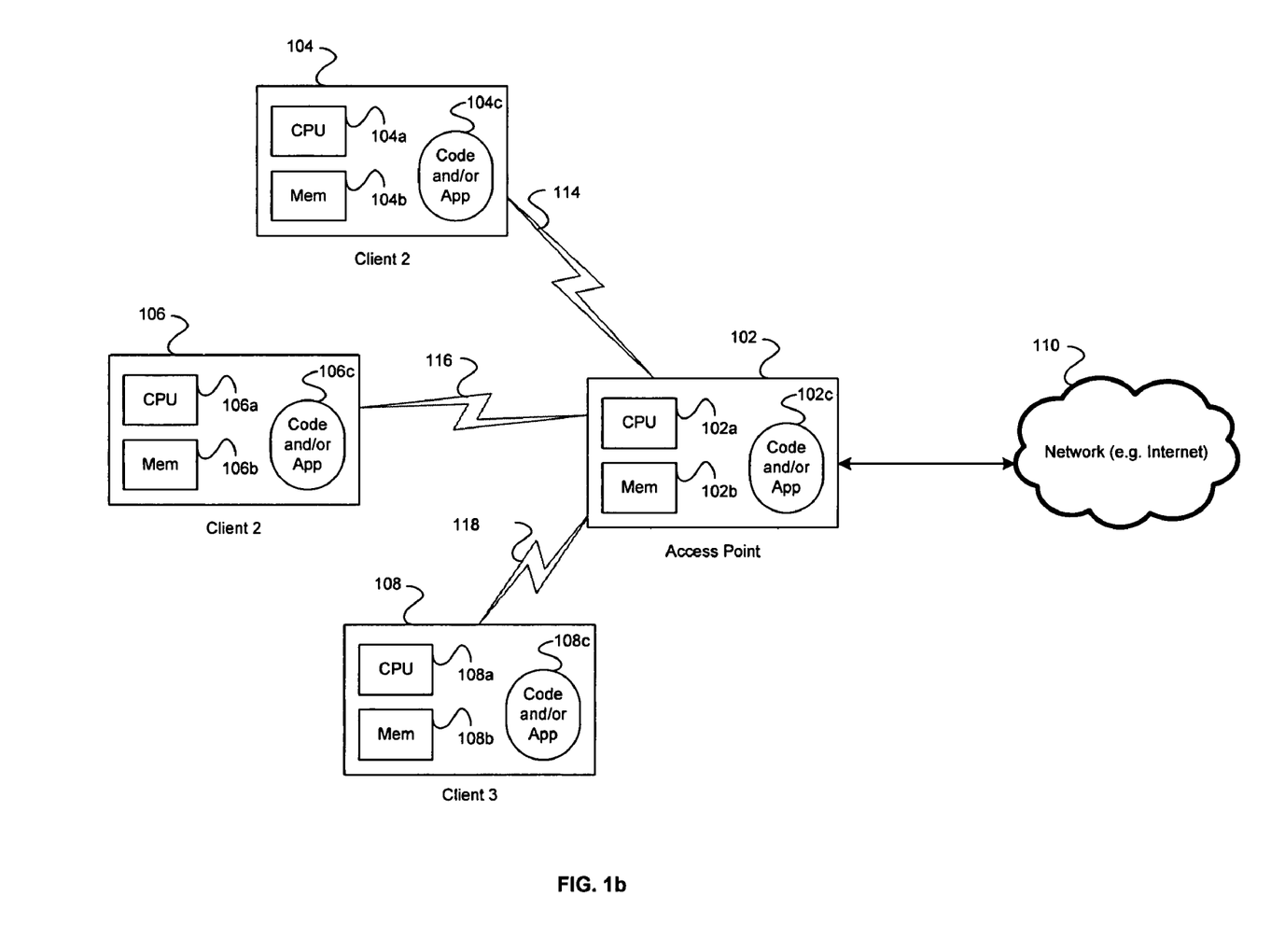
FIG. 1b is a block diagram of a software environment in an exemplary wireless network, which may be utilized in connection with an embodiment of the invention.

FIG. 1b is a block diagram of a software environment in an exemplary wireless network, which may be utilized in connection with an embodiment of the invention. Referring to FIG. 1b, there is shown an access point (AP) 102, and a plurality of client stations (STA) 104, 106, and 108, a plurality of RF channels 114, 116, and 118, and a network 110. The AP 102 may further comprise a central processing unit (CPU) 102a, system memory 102b, and code and/or application software 102c. The STA 104 may further comprise a CPU 104a, system memory 104b, and code and/or application software 104c. The STA 106 may further comprise a CPU 106a, system memory 106b, and code and/or application software 106c. The STA 108 may further comprise a CPU 108a, system memory 108b, and code and/or application software 108c. The AP 102, and the STAs 104, 106 and 108 may be substantially as described in FIG. 1a.

The CPU 102a, 104a, 106a or 108a may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The system memory 102b, 104b, 106b or 108b may comprise suitable logic, circuitry, and/or code to be utilized to store, or write, and retrieve, or read, information. It may comprise a plurality of memory technologies such as random access memory (RAM). The code and/or application software 102c, 104c, 106c or 108c may comprise a computer program.

In operation, the system memory 102b may comprise machine-readable storage having stored thereon at least one code section for enabling communication of information in a secure communication system. The at least one code section may be executable by the CPU 102a. The at least one code section may cause the CPU 102a to perform steps related to registering and configuring a client station 104 with the AP 102.

In operation, the system memory 104b, 106b or 108b may comprise machine readable storage having stored thereon at least one code section for enabling communication of information in a secure communication system. The at least one code section may be executable by the CPU 104a, 106a or 108a, respectively. The at least one code section may cause the CPU 104a, 106a or 108a to perform steps related to requesting registration and configuration of the client station 104, 106 or 108 with the AP 102.

Figure 2:
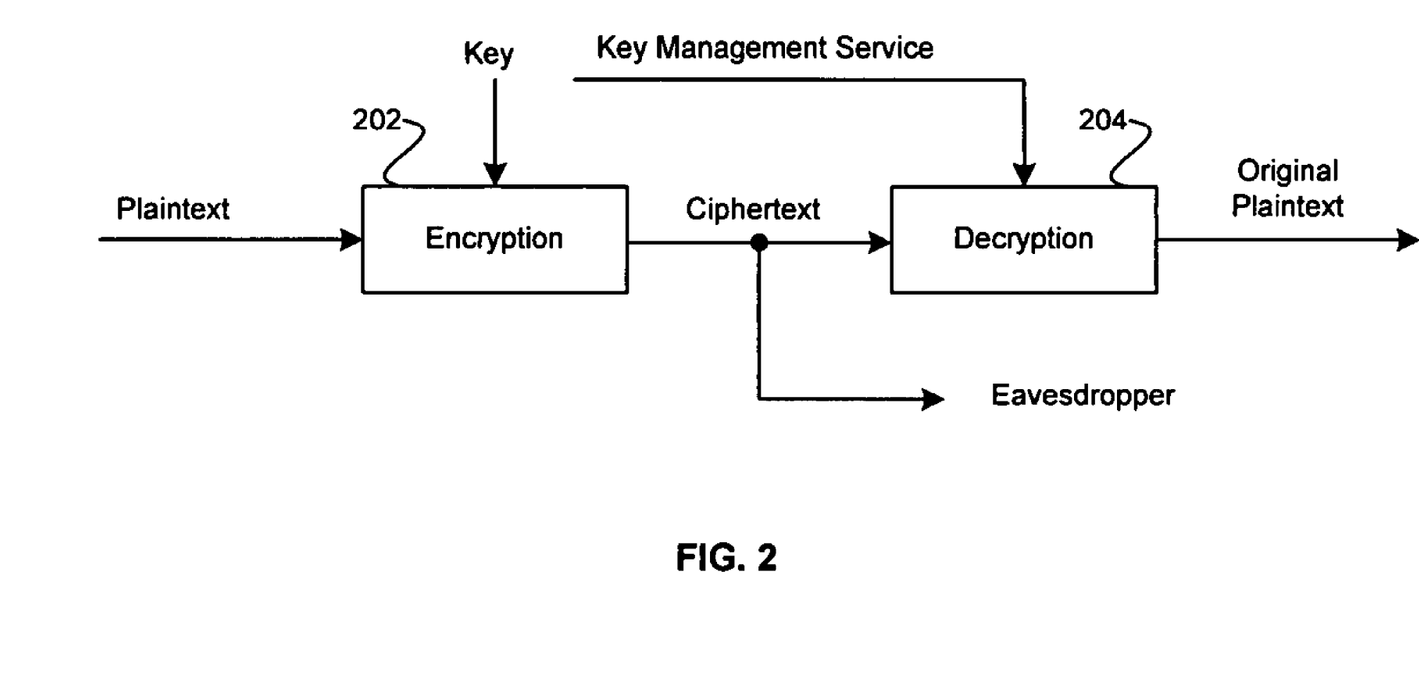
FIG. 2 is a block diagram of an exemplary secure communication system, which may be utilized in connection with an embodiment of the invention.

FIG. 2 is a block diagram of an exemplary secure communication system, which may be utilized in connection with an embodiment of the invention. With reference to FIG. 2, there is shown an encryption block 202, and a decryption block 204. The encryption block 202 may comprise suitable logic, circuitry and/or code that may be adapted to encrypt received information based on a key provided by a key management service. The decryption block 204 may comprise suitable logic, circuitry and/or code that may be adapted to decrypt received information based on a key provided by a key management service. The encryption block 202 may be adapted to encrypt, or code data so as to hide the information content from an unauthorized eavesdropper who monitors a communication channel over which the information is communicated. This encryption may enable users of WLAN systems to obtain a level of privacy in communications, which approximates that realized in wired LAN systems. Prior to transmission via an RF channel, unencrypted data, or plaintext, may be processed by the encryption block 202 into encrypted data or ciphertext based on a key. Information comprising the ciphertext may be securely transmitted via an RF channel. An eavesdropper may be unable to extract the plaintext from the ciphertext without gaining access to the key that was utilized to generate the ciphertext from the plaintext. Information received via a secure RF channel may be processed by the decryption block 204, which may retrieve the original plaintext from the received ciphertext based on a key. Various embodiments of the invention may comprise a key management service that provides a mechanism by which the encryption block 202 and the decryption block 204 may utilize a common key that may be referred to as a preshared key, or PSK. A station, for example, a client station 104, may comprise at least one of an encryption block 202 and/or decryption block 204.

Figure 3:
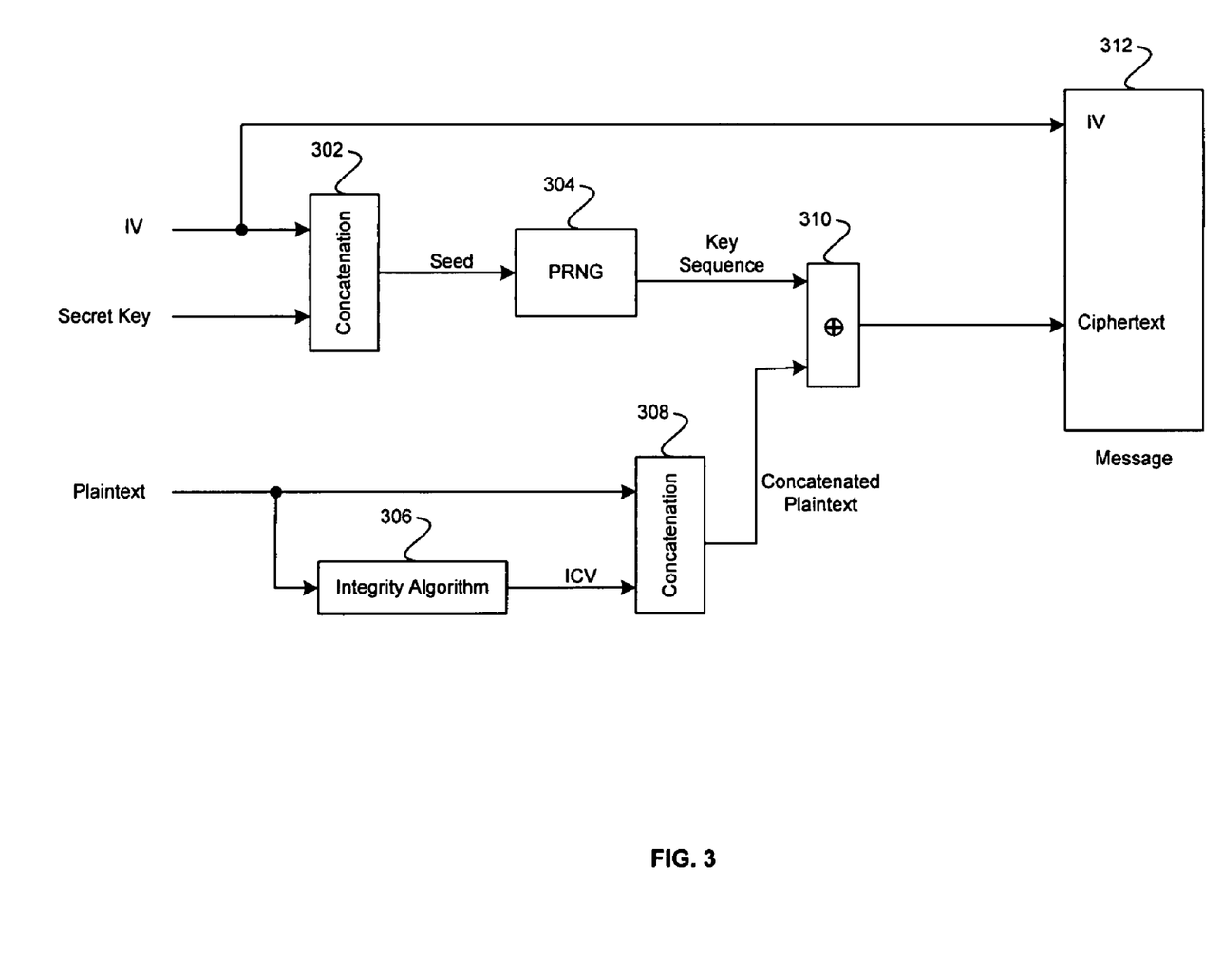
FIG. 3 is a block diagram of an exemplary encryption system, which may be utilized in connection with an embodiment of the invention.

FIG. 3 is a block diagram of an exemplary encryption system, which may be utilized in connection with an embodiment of the invention. With reference to FIG. 3, there is shown a concatenation block 302, a pseudo random number generator (PRNG) block 304, an integrity algorithm block 306, a concatenation block 308, a logical exclusive-or (XOR) block 310, and a message block 312.

The concatenation block 302 may comprise suitable logic, circuitry and/or code that may be adapted to receive input comprising an initialization vector (IV), and a secret key. The IV and secret key may be processed by the concatenation block 302 to generate a seed. The PRNG block 304 may comprise suitable logic, circuitry and/or code that may be adapted to generate a key sequence based on a received seed. The integrity algorithm block 306 may comprise suitable logic, circuitry and/or code that may be adapted to process received plaintext to generate an integrity check value (ICV). The concatenation block 308 may process received plaintext and ICV to produce concatenated plaintext. The logical exclusive-or block 310 may process concatenated plaintext and a key sequence to produce ciphertext. The message block 312 may process received IV and ciphertext to generate information, which may be transmitted via a secure RF communication channel.

In various embodiments of the invention, the secret key, also referred to as a PSK, may comprise an encryption key that, in turn, comprises a portion of configuration information that is communicated from an AP 102, to a client station 104 during authentication of the client station 104. The IV may change periodically in accordance with an encryption method being utilized. The concatenation block 302 may receive an IV and a PSK from a station 104 that transmits information via an RF channel. The PRNG block 304 may receive a seed from the concatenation block 402. The integrity algorithm block 306 may receive plaintext from a station that transmits information via an RF channel. The concatenation block 308 may receive an ICV from the integrity algorithm block 306, and plaintext from a station 104 that transmits information via an RF channel. The logical exclusive-or block 310 may receive a key sequence from the PRNG block 304, and concatenated plaintext from the concatenation block 308. The message block 312 may receive ciphertext from the logical exclusive-or block 310 and an IV from a station 104 that transmits information via an RF channel. An encryption block 202 may comprise a concatenation block 302, a PRNG block 304, an integrity algorithm block 306, a concatenation block 308, a logical exclusive-or block 310, and/or a message block 312.

Figure 4:
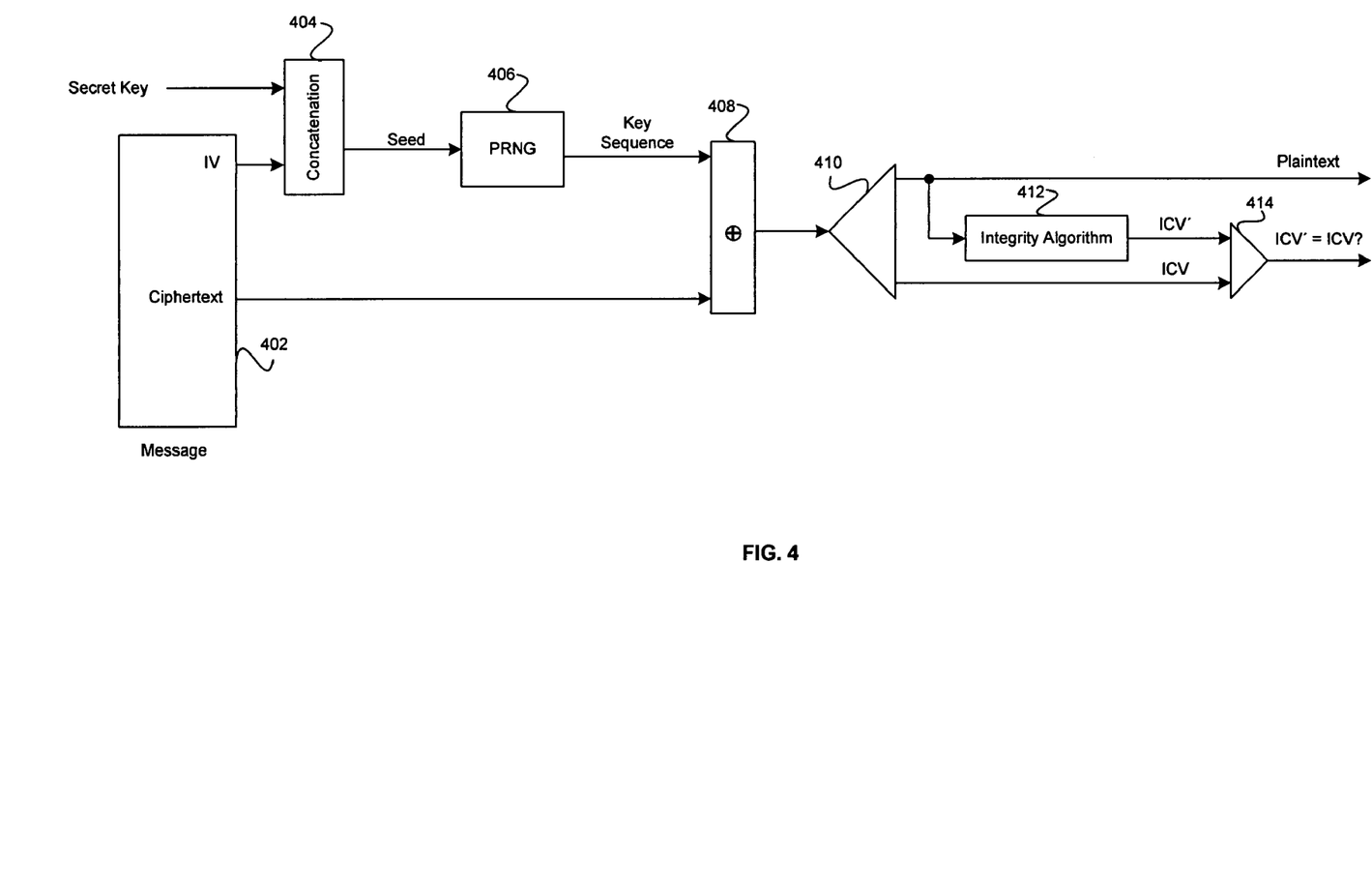
FIG. 4 is a block diagram of an exemplary decryption system, which may be utilized in connection with an embodiment of the invention.

FIG. 4 is a block diagram of an exemplary decryption system, which may be utilized in connection with an embodiment of the invention. With reference to FIG. 4, there is shown a message block 402, a concatenation block 404, a PRNG block 406, a logical exclusive-or block 408, a splitter block 410, an integrity algorithm block 412, and a combiner block 414. The message block 402 may process received information, separating the received information into constituent components comprising ciphertext and IV. The concatenation block 404 may process received IV and secret key to generate a seed. The PRNG block 406 may process a received seed to generate a key sequence. The logical exclusive-or block 408 may process received key sequence and ciphertext to decrypt the ciphertext. The splitter block 410 may process received information, separating the received information into constituent components comprising ICV and plaintext. The integrity algorithm block 412 may generate an ICV' based on received plaintext. The combiner block 414 may compare a received ICV' and ICV. The combiner block 414 may generate an output which indicates whether ICV'=ICV is true or false.

In operation the secret key may have been distributed to the concatenation block 404 utilizing a key management service. The message block 402 may receive information received by a station via an RF channel. The concatenation block 404 may receive an IV from the message block 402. The PRNG block 406 may receive a seed from the concatenation block 404. The logical exclusive-or block 408 may receive the key sequence from the PRNG block 406, and the ciphertext from the message block 402. The splitter block 410 may receive information from the logical exclusive-or block 408. The integrity algorithm block 412 may receive plaintext from the splitter block 410. The combiner block 414 may receive ICV from the splitter block 410, and ICV' from the integrity algorithm block 412. If the combiner block 414 generates an output indicating false, the received information may be determined to be in error and discarded by a station 104 that received the information via an RF channel. A decryption block 204 may comprise at least one of a message block 402, a concatenation block 404, a PRNG block 406, a logical exclusive-or block 408, a splitter block 410, an integrity algorithm block 412, and a combiner block 414.

The invention may not be limited to a specific method of encryption. Accordingly, various embodiments of the invention may utilize a plurality of encryption techniques such as wired equivalent privacy (WEP), RC4™ (Rivest's Cipher 4), the Advanced Encryption Standard (AES), the Temporal Key Integrity Protocol (TKIP) or the Counter Mode with CBC-MAC Protocol (CCMP), for example.

In various embodiments of the invention activation of a hardware and/or software enabled button at the AP 102 may begin a limited time window. The limited time window may comprise a limited time duration in which a client station 104 is allowed to register with the AP 102. The AP 102 may be configured to set a duration of the limited time window to, for example, 2 minutes. The AP 102 may communicate configuration information comprising an SSID and/or PSK during registering of the client station 104. The limited time window may begin at a time instant that corresponds to a time instant at which the hardware and/or software enabled button is activated at the AP 102. The AP 102 may register a single requesting client station 104, during the limited time window. The limited time window may also be referred to as an open registration window.

If a hardware and/or software enabled button is activated at the client station 104 during the limited time window at the AP 102, the single requesting client station 104 and AP 102 may engage in an authentication information exchange utilizing a protocol in accordance with various embodiments of the invention. The authentication information exchange may enable the AP 102 to recognize the single requesting client station 104 as being a station in a WLAN that requests configuration, in accordance with various embodiments of the invention. The authentication information exchange may comprise at least one message, for example a hello message, which is communicated from the single requesting client station 104 to the AP 102. The authentication information exchange may further comprise at least one message, for example a beacon message, which is communicated from the AP 102 to the single requesting client station 104. A hello message communicated from the single requesting client station 104 may comprise information that identifies the single requesting client station 104. A beacon message communicated from the AP 102 may comprise information related to the status of the limited time window that indicates whether the AP 102 is ready to configure a single requesting client station 104.

Based on the authentication information exchange, the AP 102 may authenticate the recognized single requesting client station 104. The AP 102 may add the single requesting client station 104 to an approved list. As a result of addition of the single requesting client station 104 to the approved list by the AP 102, the AP 102 may configure the client station. Configuration of the single requesting client station 104 may comprise an AP 102 that generates a PSK that is communicated to the single requesting client station 104. The AP 102 may encrypt the PSK and/or SSID before the PSK and/or SSID is communicated to the client station 104. The PSK and/or SSID may be communicated from the AP 102 to the client station 104 via an encrypted tunnel that is established during the authentication information exchange. The encrypted tunnel may be established between the AP 102 and the single requesting client station 104 utilizing, for example, a key exchange protocol such as the Diffie-Hellman (DH) protocol.

Based on a length of time for which a hardware and/or software enabled button is activated at the AP 102, the AP 102 may be reset. Resetting of an AP 102 may cancel registration of a client station 104 at the AP 102. Cancellation of registration of the client station 104 at the AP 102 may result in a loss of ability, of the client station 104, to communicate information in a secure communications network. The client station 104 may subsequently repeat a procedure for registering with the AP 102, in accordance with an embodiment of the invention. Activation of the hardware and/or software enabled button for a specified length of time may comprise a "long" button activation. In response to a long button activation, the AP 102 may also generate a new PSK and/or SSID.

The ability to reset an AP 102 may enhance security in secure communications networks, in accordance with various embodiments of the invention. For example, in the event that an unauthorized user is able to obtain a current PSK and/or SSID that is being utilized in a secure communications network, the unauthorized user may configure a WLAN station and obtain unauthorized ability to communicate information in the secure communications network. In this case, network security may be reestablished by performing a long button activation at the AP 102. in response to the long button activation, the AP 102 may generate a new PSK and/or SSID that may comprise values that are different from corresponding values of the current PSK and/or SSID. Consequently, the unauthorized user may be unable to obtain subsequent unauthorized ability to communicate information in the secure communications network.

At a first instance of activation of a hardware and/or software enabled button located on the AP 102, the AP 102 may generate a PSK. The generated PSK may subsequently be utilized to configure a requesting client station 104, in accordance with various embodiments of the invention.

Figure 5:
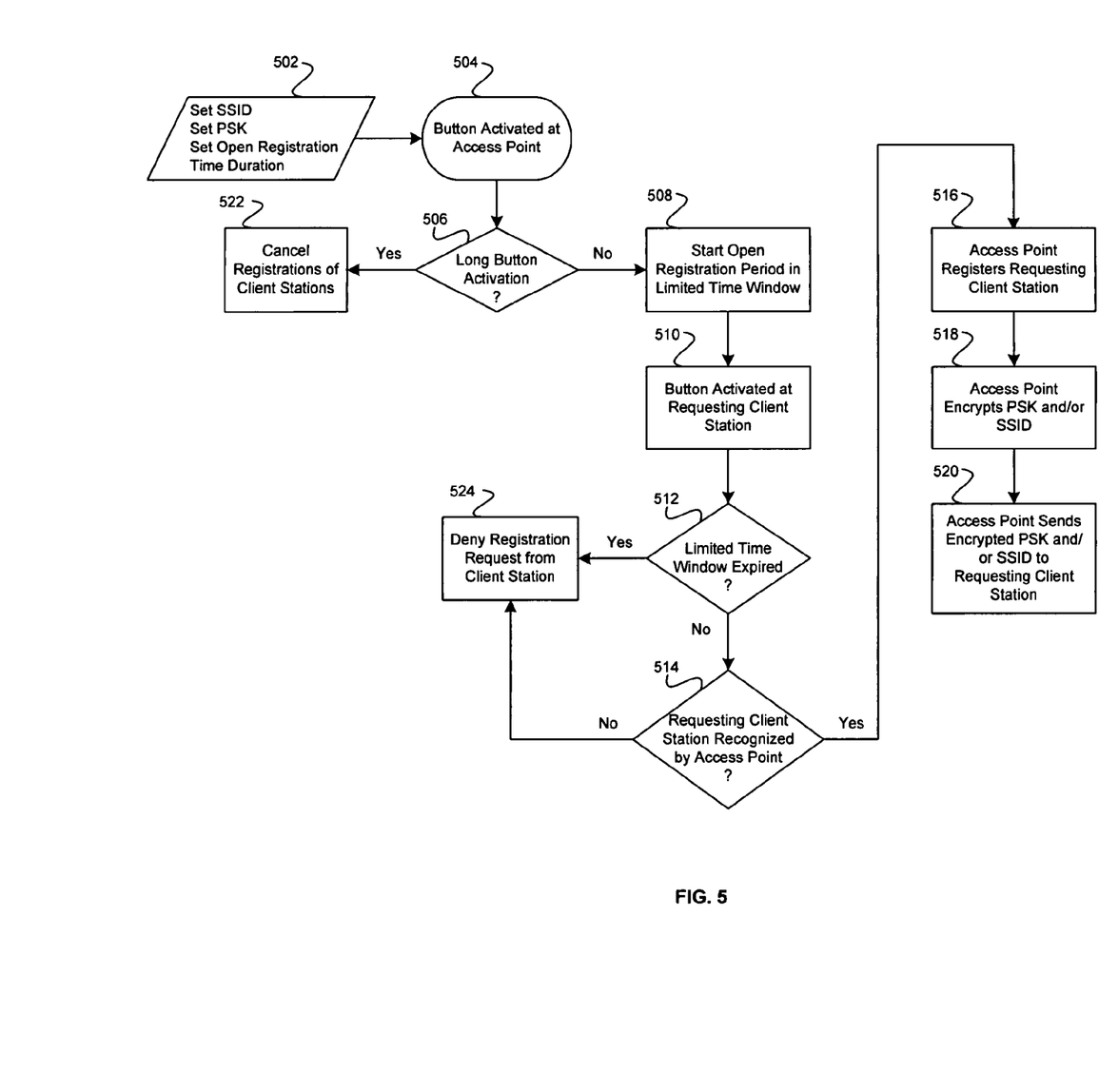
FIG. 5 is a flowchart illustrating exemplary steps performed by an AP that initiates registration of a client station, in accordance with an embodiment of the invention.

FIG. 5 is a flowchart illustrating exemplary steps performed by an AP that initiates registration of a client station, in accordance with an embodiment of the invention. In step 502, the AP 102 may be configured by setting SSID and PSK, and setting the window open time. The SSID and/or PSK may be generated by the AP 102, or entered manually by a user. The open registration time duration may comprise a time duration, beginning at a time instant corresponding to the start of a limited time window, during which the AP 102 may register a single requesting client station 104.

In step 504 a hardware and/or software enabled button may be activated at the AP 102. Step 506 may determine a length of time for which the hardware and/or software enabled button is activated at the AP 102. If the length of time does not comprise a long button activation, step 508 may start an open registration period in a limited time window at the AP 102. The start of the open registration period may correspond to a start of a limited time window during which the AP 102 may register a single requesting client station 104. In step 510 a hardware and/or software enabled button may be activated at a requesting client station 104. The requesting client station 104 may attempt to register with the AP 102 during the limited time window. Step 512 may determine if the limited time window has expired. The limited time window may expire at a time instant subsequent to a time instant at an open registration time duration amount of time subsequent to a time instant corresponding to the start of the limited time window.

If the limited time window has not expired, step 514 may determine if a requesting client station 104 is recognized by the AP 102. The AP 102 may recognize a requesting client station 104 based on a received hello message from the requesting client station, for example. A recognized requesting client station 104 may be referred to as being authenticated. If the AP 102 does recognize a requesting client station 104, in step 516 may register the AP 102 may register the requesting client station 104. In step 518, the AP 102 may encrypt a PSK and/or SSID. In step 520, the AP 102 may send the encrypted PSK and/or SSID to the requesting client station 104.

If in step 506 it is determined that a length of time for which a hardware and/or software enabled button is activated at the AP 102 comprises a long button activation, in step 522, the AP 102 may cancel registrations of client stations 104. This may include cancellation of registrations for client stations 104 that had previously requested, and been granted registration by the AP 102. As a result, the client stations 104, for which registration has been cancelled, may lose a previously established ability to communicate information in a secure communications network. In step 522, the AP 102 may also generate a new PSK and/or SSID. The new PSK and/or SSID may comprise values that are different from corresponding values of a previous PSK and/or SSID that was generated by the AP 102 or manually entered by a user.

If in step 512 it is determined that the limited time window has expired, the AP 102 may subsequently deny a registration request from a requesting client station 104. The AP 102 may continue to deny registration requests from the requesting client station 104 until a hardware and/or software enabled button is subsequently activated at the AP 102 as described in step 504.

If, in step 514, the AP 102 does not recognize a requesting client station 104, the AP 102 may subsequently deny a registration request from the requesting client station 104. The AP 102 may not recognize a requesting client station 104 that, during the authentication information exchange, sends a message to the AP 102 that is not in accordance with a protocol that is utilized in various embodiments of the invention.

Figure 6:
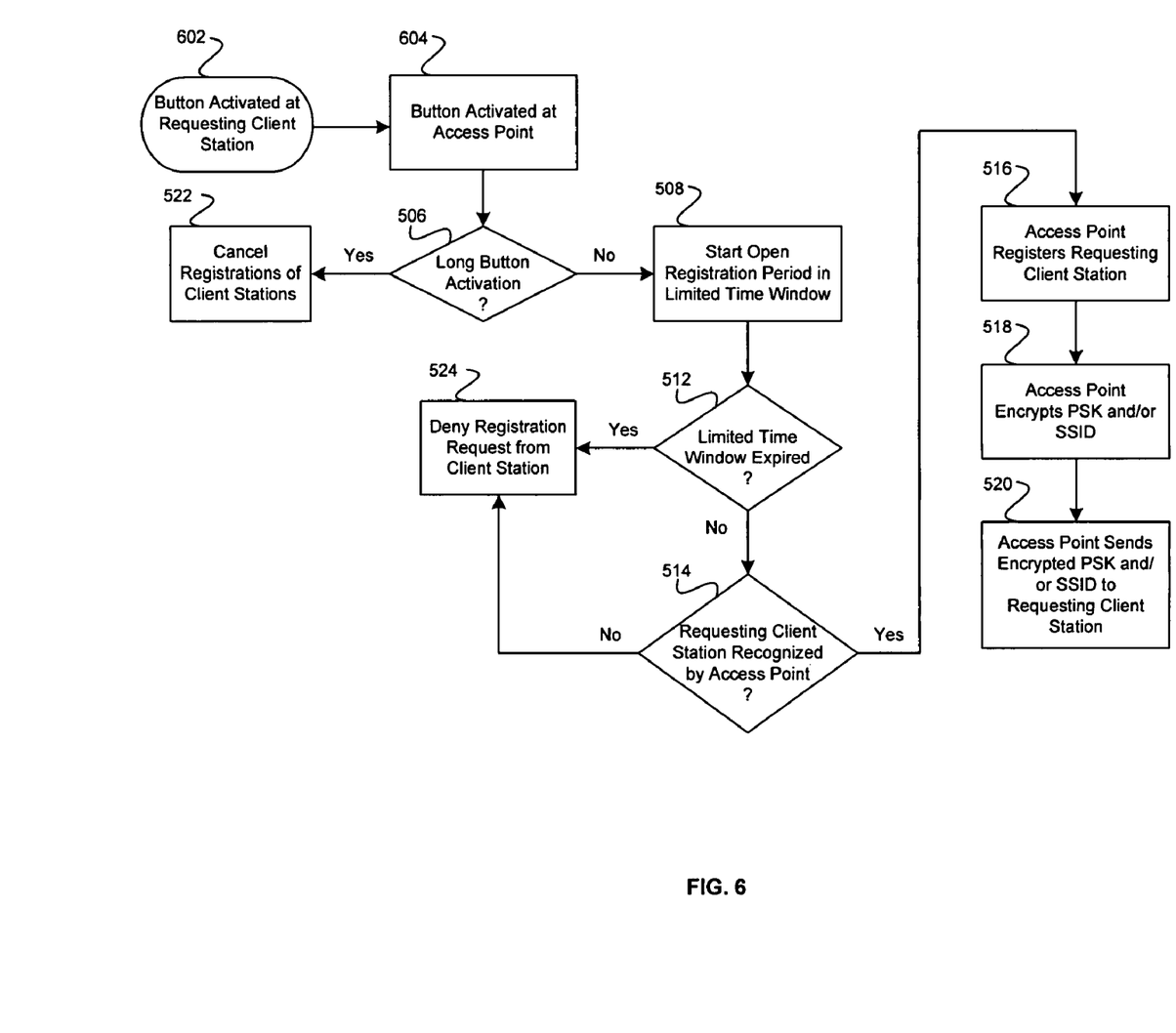
FIG. 6 is a flowchart illustrating exemplary steps performed by an AP in which a client station initiates registration of the client station, in accordance with an embodiment of the invention.

FIG. 6 is a flowchart illustrating exemplary steps performed by an AP in which a client station initiates registration of the client station, in accordance with an embodiment of the invention. The flowchart of FIG. 6 is substantially as described in FIG. 5. In FIG. 6, a hardware and/or software enabled button is activated at a client station in step 602, followed by activation of a hardware and/or software enabled button at an AP, in step 604. Step 506 may determine a length of time for which the hardware and/or software enabled button is activated at the AP 102. If the length of time does not comprise a long button activation, step 508 may start an open registration period in a limited time window at the AP 102. Step 512 may determine if the limited time window has expired.

If the limited time window has not expired, step 514 may determine if a requesting client station 104 is recognized by the AP 102. If the AP 102 does recognize a requesting client station 104, in step 516 may register the AP 102 may register the requesting client station 104. In step 518, the AP 102 may encrypt a PSK and/or SSID. In step 520, the AP 102 may send the encrypted PSK and/or SSID to the requesting client station 104.

If step 506 determines that a length of time for which a hardware and/or software enabled button is activated at the AP 102 comprises a long button activation, in step 522, the AP 102 may cancel registrations of client stations 104. If in step 512 it is determined that the limited time window has expired, the AP 102 may subsequently deny a registration request from a requesting client station 104. If, in step 514, the AP 102 does not recognize a requesting client station 104, the AP 102 may subsequently deny a registration request from the requesting client station 104.

Accordingly, the present invention may be realized in hardware, software, or a combination of hardware and software. The present invention may be realized in a centralized fashion in at least one computer system, or in a distributed fashion, where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication of information in a secure communication system, the method comprising:
   activating a button located at an access point device;
   determining an activation time duration for said button activating;
   configuring said access point device in an open registration state at an open registration start time instant when said activation time duration is less than a network reset time duration, wherein a time duration for remaining in said open registration state is determined based on an open registration time duration;
   receiving a registration request from a client station device;
   determining whether said access point is in said open registration state upon receipt of said registration request;

registering a client station device in a network in response to said registration request when said access point is in said open registration state; and configuring said access point in a registration closed state at a registration end time instant, wherein said registration end time instant is determined based on said registration start time instant and said open registration time duration.

2. The method according to claim 1, wherein said button Comprises a hardware button and/or a software enabled button.

3. The method according to claim 1, comprising generating a preshared key and/or a service set identifier in response to said button activating.

4. The method according to claim 3, wherein said activation time duration for said button activating is less than said network reset time duration.

5. The method according to claim 4, wherein said button activating is preceded by a preceding button activation, wherein an activation time duration for said preceding button activation is not less than said network reset time duration.

6. The method according to claim 1, comprising cancelling said registration request and/or one or more previously established client station device registrations when said activation time duration is not less than said network reset time duration.

7. The method according to claim 6, comprising generating a preshared key and/or service set identifier subsequent to said cancelling.

8. The method according to claim 1, comprising rejecting said registration request when said registration request is received at a time instant subsequent to said registration end time instant.

9. The method according to claim 1, comprising rejecting subsequent registration requests received during a remainder of said open registration state.

10. The method according to claim 1, comprising configuring said access point device with one or more values for a corresponding one or more of said network reset time duration, said open registration time duration, a preshared key and/or a service set identifier.

11. A system for enabling communication of information in a secure communication system, the system comprising:
one or more circuits that are operable to respond to activation of a button located at an access point device;
said one or more circuits are operable to determine an activation time duration for said button activating;
said one or more circuits are operable to configure said access point device in an open registration state at an open registration start time instant when said activation time duration is less than a network reset time duration, wherein a time duration for remaining in said open registration state is determined based on an open registration time duration;
said one or more circuits are operable to receive a registration request from a client station device;
said one or more circuits are operable to determine whether said access point is in said open registration state upon receipt of said registration request;
said one or more circuits are operable to register a client station device in a network in response to said registration request when said access point is in said open registration state; and
said one or more circuits are operable to configure said access point in a registration closed state at a registration end time instant, wherein said registration end time instant is determined based on said registration start time instant and said open registration time duration.

12. The system according to claim 11, wherein said button comprises a hardware button and/or a software enabled button.

13. The system according to claim 11, wherein said one or more circuits are operable to generate a preshared key and/or a service set identifier in response to said button activating.

14. The system according to claim 13, wherein said activation time duration for said button activating is less than said network reset time duration.

15. The system according to claim 14, wherein said button activating is preceded by a preceding button activation, wherein an activation time duration for said preceding button activation is not less than said network reset time duration.

16. The system according to claim 11, wherein said one or more circuits are operable to cancel said registration request and/or one or more previously established client station device registrations when said activation time duration is not less than said network reset time duration.

17. The system according to claim 16, wherein said one or more circuits are operable to generate a preshared key and/or service set identifier subsequent to said cancelling.

18. The system according to claim 11, wherein said one or more circuits are operable to reject said registration request when said registration request is received at a time instant subsequent to said registration end time instant.

19. The system according to claim 11, wherein said one or more circuits are operable to reject subsequent registration requests received during a remainder of said open registration state.

20. The system according to claim 11, wherein said one or more circuits are operable to configure said access point device with one or more values for a corresponding one or more of said network reset time duration, said open registration time duration, a preshared key and/or a service set identifier.

21. A machine-readable storage having stored thereon, a computer program having at least one code section for enabling communication of information in a secure communication system, the at least one code section being executable by a computer for causing the computer to perform steps comprising:
activating a button located at an access point device;
determining an activation time duration for said button activating;
configuring said access point device in an open registration state at an open registration start time instant when said activation time duration is less than a network reset time duration, wherein a time duration for remaining in said open registration state is determined based on an open registration time duration;
receiving a registration request from a client station device;
determining whether said access point is in said open registration state upon receipt of said registration request;
registering a client station device in a network in response to said registration request when said access point is in said open registration state; and
configuring said access point in a registration closed state at a registration end time instant, wherein said registration end time instant is determined based on said registration start time instant and said open registration time duration.

22. The machine-readable storage according to claim 21, wherein said button comprises a hardware button and/or a software enabled button.

23. The machine-readable storage according to claim 21, wherein said at least one code section comprises code generating a preshared key and/or a service set identifier in response to said button activating.

24. The machine-readable storage according to claim 23, wherein said activation time duration for said button activating is less than said network reset time duration.

25. The machine-readable storage according to claim 24, wherein said button activating is preceded by a preceding button activation, wherein an activation time duration for said preceding button activation is not less than said network reset time duration.

26. The machine-readable storage according to claim 21, wherein said at least one code section comprises code for cancelling said registration request and/or one or more previously established client station device registrations when said activation time duration is not less than said network reset time duration.

27. The machine-readable storage according to claim 26, wherein said at least one code section comprises code for generating a preshared key and/or service set identifier subsequent to said cancelling.

28. The machine-readable storage according to claim 21, wherein said at least one code section comprises code for rejecting said registration request when said registration request is received at a time instant subsequent to said registration end time instant.

29. The machine-readable storage according to claim 21, wherein said at least one cede section comprises code for rejecting subsequent registration requests received during a remainder of said open registration state.

30. The machine-readable storage according to claim 21, wherein said at least one code section comprises code for configuring said access point device with one or more values for a corresponding one or more of said network reset time duration, said open registration time duration, a preshared key and/or a service set identifier.

* * * * *

UNITED STATES PATENT AND TRADEMARK OFFICE
CERTIFICATE OF CORRECTION

PATENT NO. : 7,653,036 B2 Page 1 of 1
APPLICATION NO. : 11/207262
DATED : January 26, 2010
INVENTOR(S) : Cohen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this

Nineteenth Day of October, 2010

David J. Kappos
*Director of the United States Patent and Trademark Office*